July 14, 1942.  C. K. RABER  2,289,884
CLUTCH
Filed May 31, 1941  2 Sheets-Sheet 1
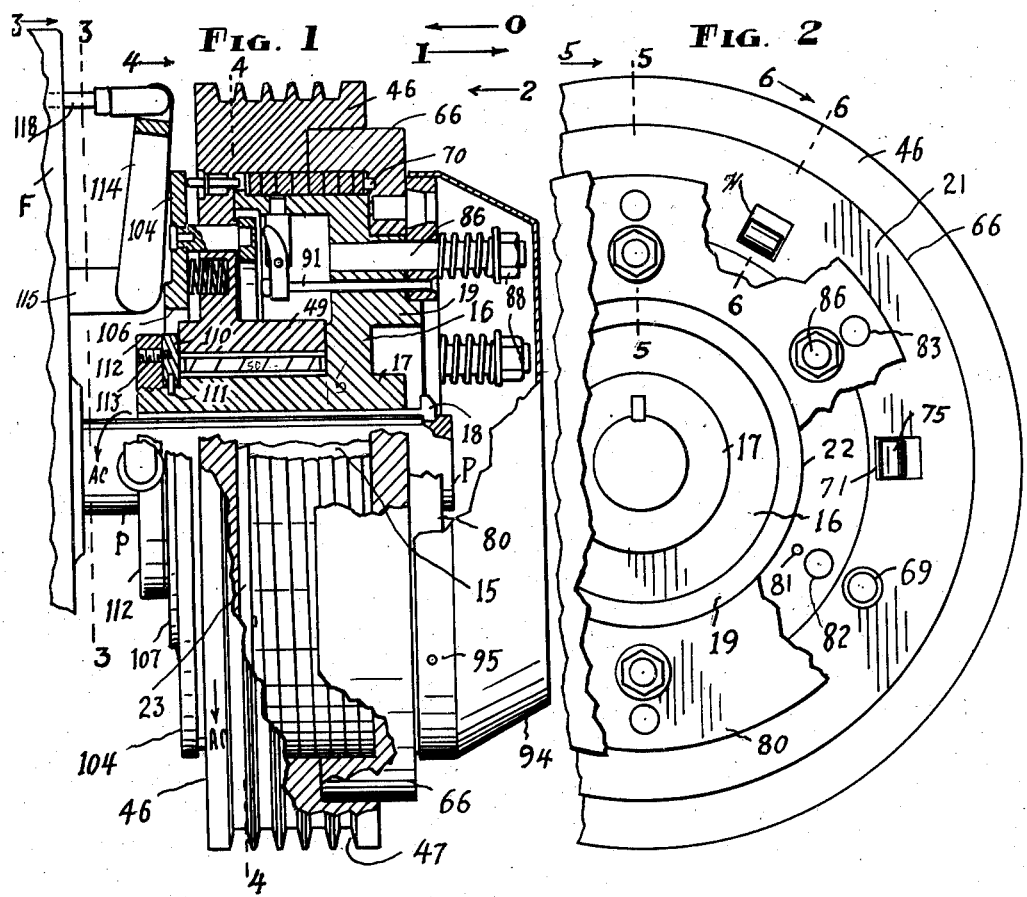
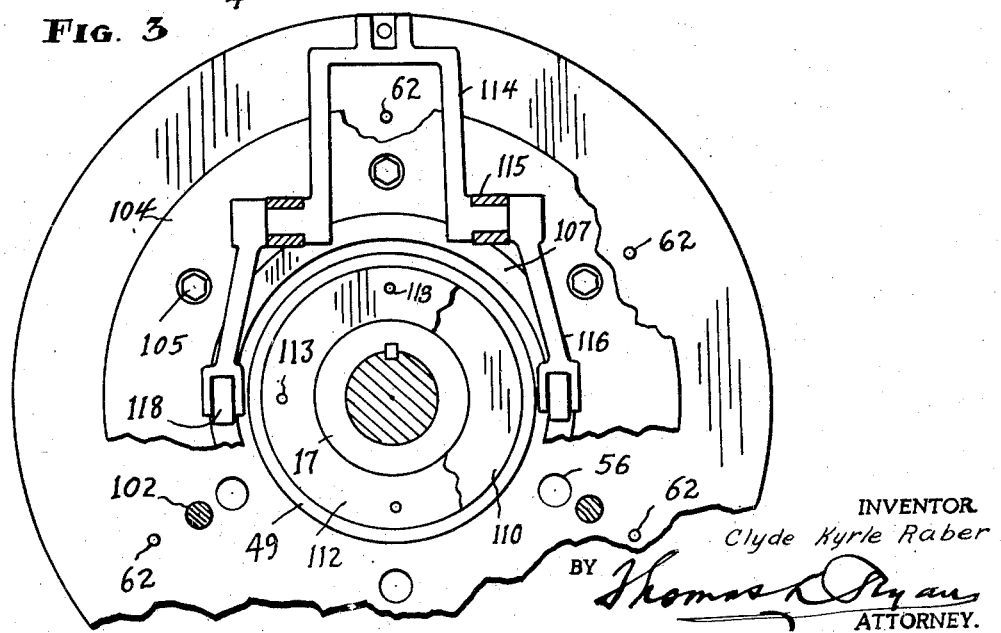
INVENTOR
Clyde Kyrle Raber
BY Thomas L. Ryan
ATTORNEY.

July 14, 1942.      C. K. RABER      2,289,884
CLUTCH
Filed May 31, 1941      2 Sheets-Sheet 2
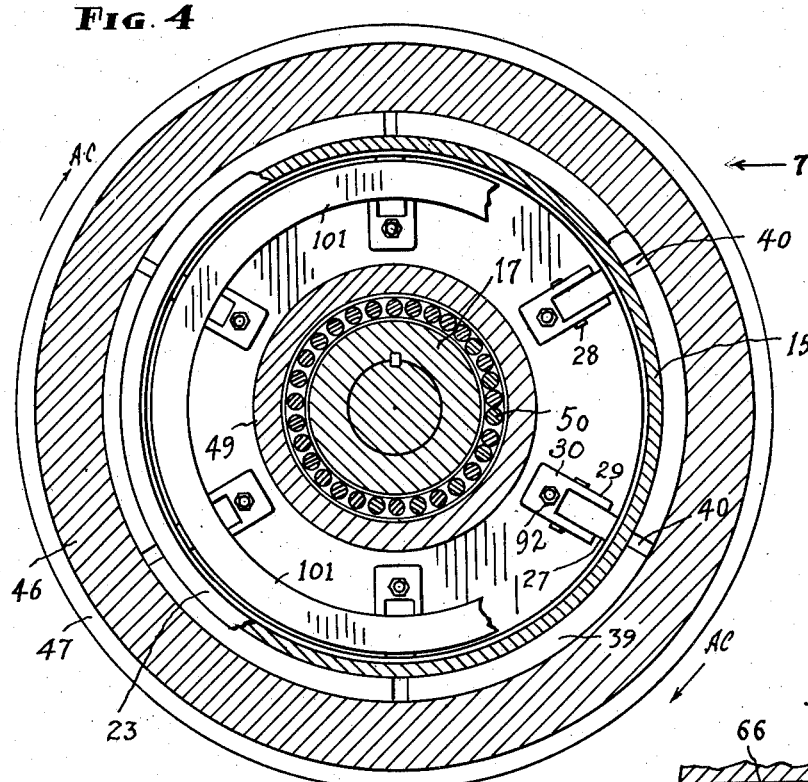
FIG. 4
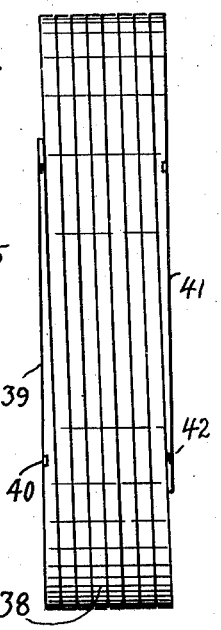
FIG. 7
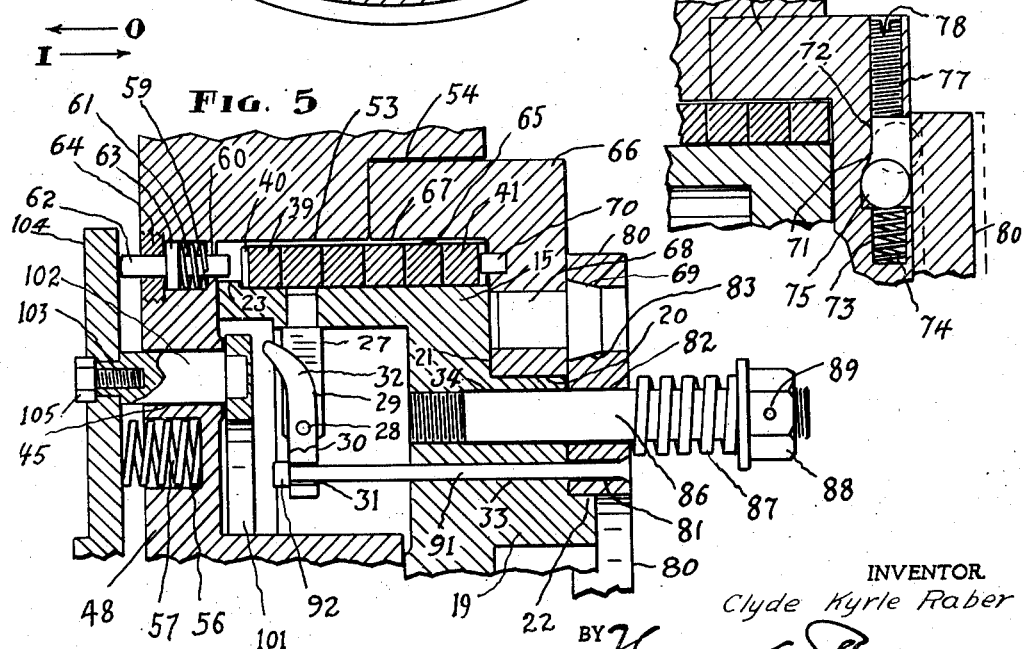
FIG. 5
FIG. 6
INVENTOR
Clyde Kyrle Raber
BY Thomas K. Ryan
ATTORNEY.

Patented July 14, 1942

2,289,884

UNITED STATES PATENT OFFICE 2,289,884

CLUTCH

Clyde Kyrle Raber, New Castle, Ind.

Application May 31, 1941, Serial No. 396,044

6 Claims. (Cl. 192—56)

The object of my invention, broadly stated, is to provide a clutch mechanism which will automatically operate to unclutched status, and to be held in said unclutched status, when and during such time as the strain to which the clutch mechanism is subjected, exceeds a predetermined limit therefor, thereby avoiding liability of injury or derangement in case of there being imposed thereon, a strain beyond said predetermined limit.

The above named general object, as well as other and more specific aims of the invention having to do with structural improvements contributing to durability, efficiency, and economy of manufacture and maintenance, as will presently appear, are accomplished by, and the invention is contained in the new construction, combination and arrangement of parts described in the following specification, illustrated in the accompanying drawings, and defined in the appended claims.

The several parts of the invention, as they appear in the different views in the drawings, are identified by suitable characters of reference applied to them.

Figure 1 is a side elevational view of my improved clutch mechanism, portions of some of the parts being broken away, and other portions being shown in central longitudinal cross section.

Figure 2 is an end view, in the direction of arrow 2 in Figure 1, portions of the device being broken away.

Figure 3 is an end view, on the broken line 3—3, in the direction of arrow 3 in Figure 1, portions of the thrust structure and portions of the retainer ring being broken away.

Figure 4 is a vertical cross section view, on the broken line 4—4, in the direction of arrow 4 in Figure 1.

Figure 5 is an enlarged cross section view, on the line 5—5 in the direction of arrow 5 in Figure 2.

Figure 6 is an enlarged detailed cross section view on the line 6—6, in the direction of arrow 6, in Figure 2.

Figure 7 is a side view of the helical spring removed, as seen in the direction of arrow 7 in Figure 4.

My invention is especially adaptable to, and it is shown herein as exemplified in a rotating shaft clutch of the type in which a helical spring carried by one main structure, fits within or upon the other main structure and through the expanding of the spring, or the contracting of the spring, as the construction may be, the two structures become locked in driving and driven relation respectively, in one direction of the driving structure's rotation.

In the present embodiment of my invention, and which is designed for the heavier duty which is imposed upon machines such as power presses or the like, the several parts of the invention are of the construction, coordination and arrangement as follows:

A driven structure consists of a drum 15 of open cylindrical formation and which embodies hub portion 17 which is adapted to receive and to have secured thereto, as by a key 18, a power shaft P. Wall 16 of the said drum embodies an axial boss 19 machined to formation so that it constitutes annular seat 20, vertical face 21, and marginal annular flange 22.

The open or rim portion of said drum embodies shallow external flange 23. At each of equably spaced locations, six in the present instance, upon the interior of the drum, is secured a pillow block 27 provided with cross pin 28 upon which is fulcrumed a lever 29 whose power arm 30 is provided with eye 31. The weight arm of said lever is bifurcated, the side members 32 thereof having their free ends of rounded formation, as indicated in Figure 5.

Extending longitudinally through said boss 19 and the wall of said drum and in alignment with the eye 31 of the said lever, is a hole 33, and adjacent thereto is a larger hole 34, the latter being threaded at its inner end.

Disposed upon said drum, in contracted status, is a helical spring 38 whose coils, preferably square in cross section, have their lateral external faces at their end portions machined so that they are in parallelism. In one end portion and which may be designated as the outboard coil 39, are spaced recesses 40; and in the other end portion, designated as the inboard coil 41, are spaced recesses 42. The rim flange 23 of the said drum constitutes an annular abutment against which the outboard coil 39 of said spring is in contact while the spring is in the contracted status.

The driving structure 46, circular in formation, is adapted to receive power transmission of any usual description, such as belting (not shown) to run in peripheral grooves 47 provided therefor. It embodies vertical wall 48 and hub 49, the latter being journaled as by antifriction bearings 50 on the hub 17 of the said drum. Bore 53 of said driving structure is of diameter predeterminately greater than the external diameter of said drum. Provided in said driving structure 46 is a counterbore 54 which is of length about one half of the length of the aforesaid bore 53.

In each of equably spaced locations on the outboard face of the wall 48 of said driving structure and in proximity with the hub portion thereof, is a pocket 56 in which is retained a protractive coil spring 57.

In counterbore 59 of each of equably spaced longitudinal holes 60 which are adjacent to the said bore 53 and which extend throgh the wall of said driving structure 46, is a protractive spring 61. The inner end portion of a bolt 62 whose integral annular collar 63 bears against said spring 61 is received in said hole 60, and its outer end is received free in the bore of a countersunk threaded ring 64 that is flush with the face of said wall, and which constitutes an abutment against which the collar 63 of said bolt is yieldingly held by the said spring, as illustrated in detail in Figure 5.

A member which is adapted to be driven, in the manner presently to be described, consists of an annulus 66, and which I designate as a follower. It is of external diameter to be received in the counterbore 54 of the said driving structure, and its wall is of internal diameter to be received on the annular seat 20 of boss 19 of the said drum. The bore 67 of said follower is of diameter the same as that of the bore 53 of the said driving structure. At each of equably spaced locations, six in the present instance, is fixedly secured a stud 68 which embodies a tapered head 69 and which protrudes from the external side face of said follower. In each of equably spaced locations, on the inner face of the wall of said follower and adjacent to the bore 67 thereof, is a stud 70. The spacing of these studs is the same as the spacing of the recesses 42 of the inboard coil of said helical spring 38.

Figure 6 is now referred to. Provided in the external side face of the circumferential portion of said follower 66 are similarly equably spaced recesses 71. Each is of predetermined length and depth, and said depth is of decreased dimension at the outboard portion 72 thereof. Extending from said recess at a right angle thereto and radially of said follower is a bore 73 in which is contained a coil spring 74. Disposed upon said coiled spring is a movable device such as a roller 75 of diameter equivalent to the depth of, and of length to freely reside in said recess. In a threaded hole 77 that extends from the circumferential face of said annulus into the outboard portion 72 of said recess, is a depresser screw 78 the inner end of which is in registration with the entrance to the portion 72 of said recess. The features just described will be presently referred to.

Lug ring 80 which is disposed on the annular flange 22 of the boss 19 of the driven structure is provided with holes 81 and 82 which are spaced to register with the holes 33 and 34 respectively of the said drum. Said lug ring is also provided with cone shaped openings 83 which are spaced to receive, and in which reside the tapered heads 69 of the studs 68 when the said lug ring is placed in its position of face to face relation with the external side face of said follower. It will be observed now, (referring to Figure 6) that the plane of the inner vertical face of the said lug ring is coincident with the plane of the circumferential faces of the said rollers 75.

Passed through each of the said holes 82 of said lug ring, and screwed to secure position in the threaded hole 34 of the said drum, is a stem 86. Loose on said stem is a protractile coil spring 87. By a head nut 88 screwed on said stem and against the outer end of said spring 87 the degree of pressure desired to be exerted by the spring against the said lug ring 80 urging the latter to positive and firm status in its seated position, as shown in the drawings, may be varied. By a device such as a set screw 89 or the like, the said head nut may be made fast at the position to which it will have been adjusted.

A pull rod 91 retained free in each of the holes 81 of the said lug ring 80 is passed through the hole 33 of said drum and through the eye 31 of said lever 29, and has its inner end provided with a binding nut 92.

A protective shield for the said lug ring and the related parts thereof may consist of a light metal cap 94 made fast to the lug ring as by cap screws 95.

A thrust structure consists of an out-pressure ring 101, so called because of its being adapted to be moved in the direction of arrow O, in Figures 1 and 5 or de-thrustwise, having equably spaced forwardly projecting struts 102, each having an axial boss 103 with threaded bore. This ring is disposed with its studs passed through apertures 45 therefor provided in wall 48 of the said first section of the driving structure. An in-pressure member, so called because of its being adapted to be moved in the direction of arrow I, in Figures 1 and 5 or thrustwise, consists of a ring shaped plate 104 provided with spaced holes in which are received the bosses of the said struts 102. With the cap screws 105 screwed home on the counterbored seats therefor in said ring plate 104, the completed thrust structure appears in cross section as in Figure 5, the springs 57 urging the said ring plate 104 outwardly to the limit dictated by the length of said struts and by the ring 101 coming to engagement with the inner face of said wall 48. The internal diameter 106 of said ring plate is such as to clear the hub 49 of the driving structure; and the raised annular face 107 accommodates the bearings of an actuating device of any conventional kind.

Preparatory to combining the driving structure 46 and the thrust structure 101—102—104, with the follower 66, the binding nut 92 on the pull rod 91 is screwed against the power arm 30 of the lever 29, the nose portion of the weight arm being brought to a plane that is distant from the vertical face of said drum, a measure of the thickness of the ring 101 plus the depth of the recesses 40 of the outboard coil of the helical spring assuming the said ring to be at the outwardly pressed position.

The slight spacing 65 (see Figure 5) between the external face of the helical spring, and the common bore 53—67 of the driving structure and follower, exaggerated for clarity of illustration, indicates the clearance which actually exists in practice and which amounts to several thousandths of an inch.

A metal ring 110 which is mounted, and is held non-rotatively, as by a pin 111, on the hub 17 of the said driven structure, lies immediately against the vertical face of the hub 49 of the driving structure, and it constitutes a lateral bearing for said hub, and also a closure of the space within which the anti-friction bearing 50 is retained. A stay ring 112 which is screwed on the hub 17 to tightened relation with said ring 110 stays the latter, and, in turn, it is fixedly secured by a lock screw 113.

Typical actuating means for moving the thrust structure in the direction of arrow I may consist of a conventional lever 114 fulcrumed on bracket or brackets 115 supported by an adjacent fixed object, such as frame F of machine having power shaft P, the ends 116 of the forked weight arm of said lever having anti-friction bearings 118 to engage the annular race 107 of the thrust member 104, and the power arm 118 of said lever being connected to operating devices (not shown).

The invention in readiness for use appears as in Figure 1, the thrust structure being in the outwardly urged position, in the direction of arrow O, by the springs 57 and resisting the lesser urge by the actuator lever 114. The bolts 62 are in the outwardly urged position, by the springs 61. Helical spring 38 rests with its outboard coil 39 abutting against flange 23 of the drum 15, and its inboard coil 41 in engagement with the anchor studs 70 and against the inner face of the follower 66.

Lug ring 80 by the urge of the springs 87 is held with its inner face against the outer face of the wall of said follower 66.

The direction, assumed, in which the driving structure is rotating, is anti-clockwise, as indicated by the arrow AC in Figure 1.

Upon actuating the lever 114 (by means not shown) the thrust structure is moved in the direction of arrow I. In this move, the pressure exerted by the ring 104 against the bolts 62 cause the latter to move inwardly whence they come into engagement with the recesses 40 of the outboard coil 39 of the helical spring. The inboard coil 41 of said spring being in anchored connection (at studs 70) with the follower 66, the coils of the said spring are caused to expand whence they come into frictional metal to metal engagement with the bore 53 of the driving structure, and the bore 67 of the follower. The power of the driving structure 46 is transmitted through the coils of the helical spring and through the follower 66, the tapered studs 69, lug ring 80 and stems 86 to the drum 15 which now is being driven.

The driving action proceeds normally until there occurs an overload. Upon the occurrence of a load in excess of the degree of capacity for which the tension of the springs 87 and the taper 69 of the studs 68 will have been provided, the reverse power (incident to such overload) acting to impede the normal momentum of the driving structure, causes the lug ring 80 to resist the studs 68 and the springs 87, and the latter, yielding to the stress of said reverse urge of the lug ring, permits the latter to move from its normal position longitudinally. In such yield, the lug ring rides on the tapered lugs and in the direction of the arrow I (Figures 1 and 5). In this move of the said lug ring, the pull rods 91, actuating the levers 29 cause the weight arms 32 of the latter to impinge against the ring 101 whereby, through its struts 102 the thrust ring 104 is moved de-thrustwise (in the direction of arrow O) the springs 57 augmenting such movement. Simultaneously the springs 61 will have moved the bolts 62 outwardly and to positions disengaged from the outboard coil 39 of said helical spring. The said helical spring having become contracted, it will have become disengaged from the bore 53 of the driving structure, and the bore 67 of the follower and its outboard coil 39 will have resumed its position engaged with the rim flange 23 of the said drum, and the said driven structure will have come to rest.

In the meantime (see Figure 6) the rollers 75 will, by the urge of the springs 74, have been projected from their normal positions into the outboard portions 72 of the recesses 71, and in which said projected positions they are, by the urge of the springs 74 retained, thereby the lug ring being held in position spaced from the follower 66.

After the cause of the overload is removed and the normal action of the mechanism is to be resumed, the screws 78 are turned inwardly, thereby forcing the rollers 75 to their normal positions in their recesses. Then, by the urge of the springs 87, the lug ring is pressed to its normal position in direct and firm union with the follower 66. The operator now drives the screws 78 to their normal positions as shown in Figure 6, and the mechanism is again in readiness for use.

In predetermining the resistance intended to be offered by the lug ring to the forces (incident to overload) tending to dislodge it from its normal position, there is taken into account the degree of tension of the springs 87, and the degree of taper of the studs 69. It is considered that the function of the said springs 87 is mainly to assure the maintenance of the ring in its position under normal loads; and that the function of the studs 68 is, besides acting as power transmitting elements interconnecting the lug ring and the follower, to afford an escapement of the lug ring when the load beyond the limit prescribed for the machine may occur. The heavier the predetermined load limit, the lesser is the incline of the taper of the said studs.

It will be understood that the invention described, is subject to such changes, modifications and departures from what is specifically illustrated and as may occur to those skilled in the art to which the invention appertains, without departing from the principle of the invention and as defined in the appended claims.

What I claim as my invention, is:

1. A clutch mechanism comprising an open cylindrical driven structure embodying a hub adapted to be fixed to a shaft and the wall thereof embodying a circular axial boss provided with annular flange, a driving structure embodying a wall, a bore, and a counterbore, a driven member annular in formation and reposed in the said counterbore and having a bore of diameter the same as the bore of the said driving structure, the common diameter of the said bores being of dimension predeterminately greater than the external diameter of the said driven structure, spaced external tapered lateral studs on said annular driven member, spaced internal longitudinal anchor studs on the said annular driven member and adjacent to the bore thereof, the said driving structure so constituted as above described being mounted for rotative movement and being retained in coordinated relation with the said driven structure, a helical spring comprising inboard and outboard coils reposed on the driven structure the external face of the end of the outboard coil, and the external face of the end of the inboard coil thereof being in parallel alignment and each of said faces being provided with spaced recesses, the recesses of the inboard coil being adapted to be engaged by said anchor studs, a lug ring retained on the annular flange of the boss of said driven structure and held against rotative movement thereon, means to hold the lug ring yieldably against longitudinal movement, the said lug ring being provided with tapered recesses in which are received the aforesaid tapered studs of the said annular driven member, bolts loose in longitudinal apertures therefor in the wall of the said driving structure, spaced with relation to the spacing of the recesses of the outboard coil of said helical spring, and which said bolts are adapted to be moved inwardly and to engagement with said recesses, means to urge the said bolts outwardly, a longitudinally movable thrust structure carried by the driving structure and which is adapted to be moved to and held in pressing engagement with said bolts, whereby by the engagement of the bolts in the recesses of the outboard coil of said helical spring, and by engagement of the recesses of the inboard coil of said spring at the said anchor studs, the said spring is caused to expand to driving contact with the common bore of the driving structure and the said annular driven member when the spring is operated, and shifter devices carried upon the interior of the driven structure which are operable when the lug ring is caused to be moved from its normal position, to shift the thrust structure whereby the aforesaid bolts are rendered ineffective to retain engagement with said helical spring, the latter thereby being permitted to contract, the power transmitting relation between said driving structure and said annular driven member being thereby discontinued.

2. A clutch mechanism comprising an open cylindrical driven structure embodying a hub and a circular axial boss, a driving structure embodying a wall, a bore and a counterbore, an annular driven member reposed in the counterbore and having a bore of diameter the same as the bore of the said driving structure, the common diameter of the said bores being of dimension predeterminately greater than the external diameter of said driven structure, spaced external tapered studs on said annular driven member, spaced internal anchor studs on the annular driven member and adjacent to the bore thereof, the said driving structure and said annular driven member being mounted for rotative movement and being retained in coordinated relation with the said driven structure, a helical spring comprising inboard and outboard coils reposed on the driven structure, the external face of the end of the outboard coil, and the external face of the end of the inboard coil being in parallel alignment, the external face of the inboard coil being adapted for engagement with the said anchor studs, spaced stems projecting longitudinally from said driven structure, a lug ring retained on said stems, the said lug ring having tapered recesses in which are received the aforesaid tapered studs, a protractile coil spring on each of said stems adapted to bear against said lug ring, a nut threaded on each stem to hold the spring at adjusted tension, bolts loose in longitudinal apertures therefor in the wall of the driving structure and in alignment with and adapted to be engaged by the outboard coil of said helical spring, means to urge said bolts outwardly, a longitudinally movable thrust structure adapted to be moved to and held in pressing engagement with said bolts, shifter devices carried upon the interior of said driven structure operable to shift the thrust structure outwardly, and power transmitting members interconnecting the lug ring and said shifter devices to actuate the latter when the lug ring is moved longitudinally.

3. A clutch mechanism of the kind described, comprising a drum embodying a hub and a circular axial boss, a driving structure embodying a hub and which is mounted for rotative movement on the hub of said drum, said driving structure having a bore and a counterbore, an annular follower reposed in the counterbore of the said driving structure, the common bore of the interrelated driving structure and said follower being of diameter predeterminately greater than the diameter of said drum, and the said follower being retained on the boss of said drum, spaced external tapered studs on the external face of said follower, spaced internal anchor studs on the interior of said follower and adjacent its bore, a helical spring comprising inboard and outboard coils reposed upon said drum, the external faces of the outboard and inboard ends of said spring being parallel, and the external face of the inboard coil being adapted for engagement with said anchor studs, spaced stems projecting from said boss, a lug ring retained on said stems and having recesses in which the said tapered lugs are received, a protractile coil spring on each of said stems adapted to bear against said lug ring, a nut on each stem to hold the said coil spring at adjusted tension, bolts loose in the wall of said driving structure and in alignment with and adapted to be engaged by the outboard coil of said helical spring, springs to urge said bolts outwardly, a longitudinally movable thrust structure carried by said driving structure and adapted to be moved to pressing engagement with said bolts, shifter devices carried by the drum operable to shift the thrust structure outwardly, power transmitting members interconnecting the lug ring and said shifter to actuate the latter when the lug ring is moved longitudinally, and stay devices that are automatically operable to stay the lug ring after it will have been so moved.

4. A clutch mechanism comprising a driving member, a follower, a driven member, a power transmitting device carried by the driven member and which is operable to engagement with the driving member and the follower, bolts carried by the driving member and urged to position normally disengaged from, but which are adapted to be moved to engagement with the said power transmitting device to actuate the latter, a thrust structure movable thrustwise to move said bolts to and to hold them in engagement with said power transmitting device, and dethrustwise to permit said bolts to become disengaged from said power transmitting device, shifters carried by the driven member operable to move the thrust structure dethrustwise, a lug member carried by the driven member and which is yieldably coupled to said follower, and power transmitting parts interconnecting the lug member and the shifters whereby upon the lug member yielding its position the thrust structure is automatically moved dethrustwise.

5. A clutch mechanism, comprising a driving member, a follower, a driven member of diameter to provide an annular cavity between it and the driving member and follower, a helical spring carried by the driven member and which is operable to engagement with the driving member and follower, bolts carried by the driving member and urged to positions normally disengaged from but which are adapted to be moved to engagement with the said spring to actuate the latter, a thrust structure operable thrustwise to move said bolts and to hold them in engagement with said spring, and dethrustwise to permit them to be disengaged from said spring, shifters carried by the driven member operable to move the thrust structure dethrustwise, a lug member carried by the driven member and coupled to said follower but which is capable of yielding its position longitudinally, power transmitting parts interconnecting the lug member and the said shifters, and stay devices carried by the follower that are automatically operable, when the thrust structure will have been moved dethrustwise, to stay the lug member against return to its normal position.

6. A clutch mechanism, comprising a driving member, a follower concentric therewith and being provided with lateral spaced external tapered studs, a driven member of diameter to provide an annular cavity between it and the driving member and follower, a helical spring carried by the driven member and which is operable to engagement with the driving member and follower, bolts carried by the driving member and urged to position normally disengaged from but which are adapted to be moved to engagement with the said spring to actuate the latter, a thrust structure carried by the driving member and operable thrustwise to move said bolts to and to hold them in engagement with said spring, and dethrustwise to permit them to become disengaged from said spring, shifters carried by the driven member operable to move the thrust structure dethrustwise, an annular lug member carried by the driven member and having spaced cone shaped recesses in which are received the aforesaid tapered studs of said follower, means carried by the driven member to yieldably retain the lug member against said follower, power transmitting parts interconnecting the lug member and the shifters, and stay devices carried by the follower that are automatically operable to stay the lug member in position spaced from the follower, when said lug member will have become displaced.

CLYDE KYRLE RABER.